_United States Patent_ [19]

Hall et al.

[11] 3,737,197
[45] June 5, 1973

[54] SEAT BELT ANCHOR MECHANISM FOR ADJUSTABLE SEAT

[75] Inventors: Garth O. Hall; Donald J. Zach, both of Milwaukee, Wis.

[73] Assignee: Universal Oil Products Company, Des Plains, Ill.

[22] Filed: Dec. 29, 1971

[21] Appl. No.: 213,572

[52] U.S. Cl............297/385, 248/429, 280/150 SB, 296/65 R, 297/308
[51] Int. Cl..........................A62b 35/00, B60r 21/00
[58] Field of Search................248/377, 378, 399, 248/419, 421, 429; 297/308, 385, 386, 388; 296/65 R, 65 A; 74/469; 280/150 SB

[56] References Cited
UNITED STATES PATENTS

| | | | |
|---|---|---|---|
| 3,109,621 | 11/1963 | Simons et al. | 248/399 |
| 3,186,760 | 6/1965 | Lohr et al. | 297/216 |
| 3,315,935 | 4/1967 | Clevett, Jr. et al. | 248/429 |
| 3,493,211 | 2/1970 | Barecki et al. | 248/399 |

Primary Examiner—Casmir A. Nunberg
Attorney—James R. Hoatson, Jr., Barry L. Clark and William H. Page II

[57] ABSTRACT

Seat belt anchor mechanism for vertically movable suspension seat having fore and aft adjustment feature provides an anchor point for a lap belt which is spaced from the floor and movable relative to the floor. The anchor point is on a guide member carried by a slide on the upper movable seat frame and is movable vertically with the seat suspension but remains stationary when the movable seat frame is adjusted fore and aft. The guide member and anchor point are carried at the end of a pivot link attached at its forward end to the floor of the vehicle. Thus, a tether belt connecting the guide member to the floor can be kept taut when the suspension is at the upper end of its ride zone, irrespective of the position of the seat in a fore and aft direction.

8 Claims, 4 Drawing Figures

PATENTED JUN 5 1973　　　3,737,197

SEAT BELT ANCHOR MECHANISM FOR ADJUSTABLE SEAT

BACKGROUND OF THE INVENTION

This invention relates to an anchor mechanism for a seat belt and more particularly, to such a mechanism for use with a suspension seat having a large amount of vertical travel for isolating the occupant from shocks and vibrations, and substantial horizontal travel for adjusting the position of the seat fore and aft to the position most comfortable to a particular occupant.

Although the conventional floor mounting for a seat belt is quite satisfactory for an automobile wherein the seat permits a very limited degree of vertical motion, it is not satisfactory for use with a suspension seat which generally provides 4 or more inches of vertical travel. In suspension seats, it has been common to anchor the lap belt to the movable side frame of the seat and then anchor the movable seat frame to the floor with a tether belt which is adjusted to be taut in the extreme upper position of the suspension. An example of such a mounting can be seen in U.S. Pat. No. 3,493,211. A problem with the last mentioned type of mounting arises when the seat is of the type having a capability of being adjusted in a fore and aft direction. Since a typical adjustment range for such a seat is about 4 inches, it will be readily appreciated that the movable seat frame to floor tether belt must be sufficiently long to accommodate the entire range of vertical seat movement while the seat is in its extreme forward position. When the seat is in any other fore and aft position, the tether belt will be slack in the uppermost position of the seat suspension and therefore incapable of offering any restraint until after the seat has been damaged by being moved upwardly beyond its upper limit.

SUMMARY

The seat belt anchor mecahnism of the present invention overcomes the problem of too much slack in the tether belt by anchoring the lap belt and connecting the tether belt to a support member which is free to move up and down with the seat but which is restrained from moving horizontally at any vertical position of the seat by being connected to a pivot link which is connected to the floor and to the support member. The support member includes a guide portion which cooperates with a slide member affixed to the movable seat frame to permit the seat and slide member to move horizontally relative to the guide portion so that the seat can be adjusted fore and aft without affecting the amount of slack in the tether belt. The slide member also transmits the vertical motion of the seat frame and suspension to the guide portion which moves up and down generally vertically but in a slight arc by virtue of being mounted at the end of an elongated pivot link pivotally mounted to the floor of the vehicle.

DESCRIPTION OF THE PREFERRED EMBODIMENTS

Figure 1:
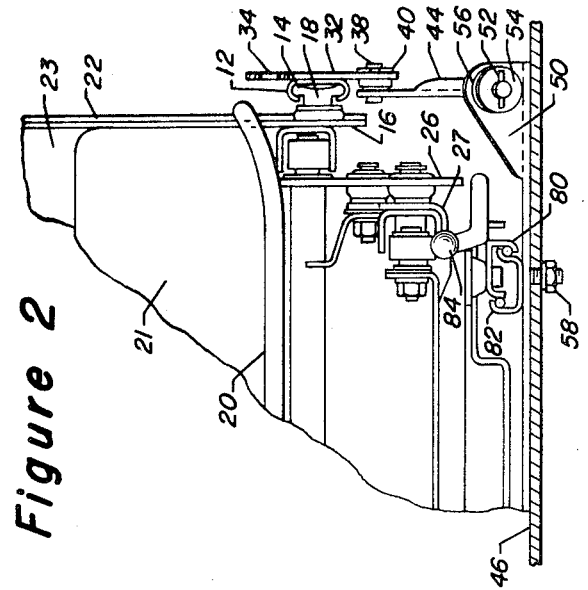
FIG. 1 is a side plan view showing the improved seat belt anchor mechanism in its installed position attached to a suspension seat and to the floor of a vehicle.
Figure 2:
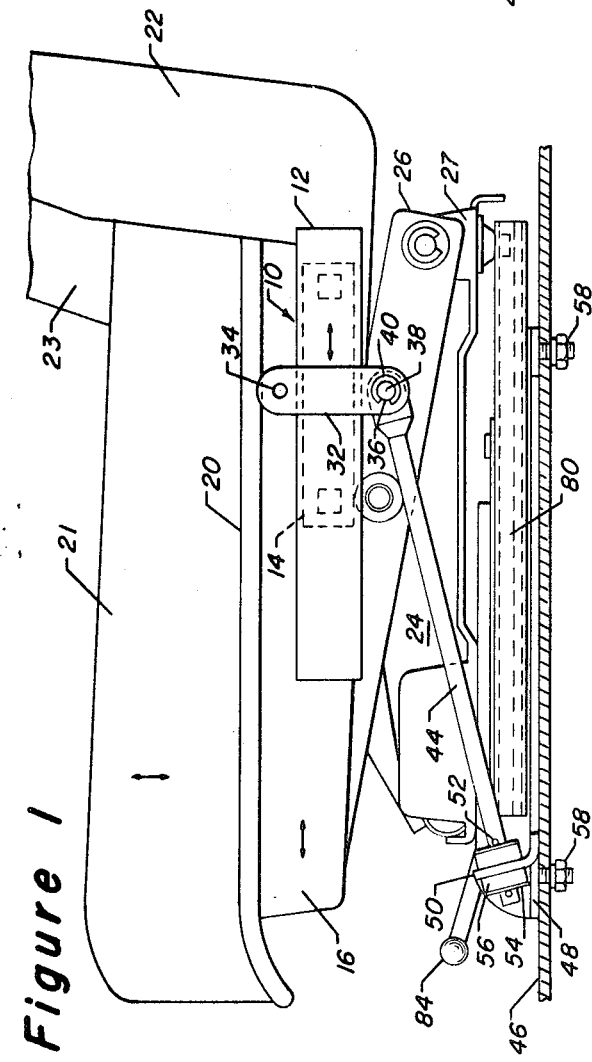
FIG. 2 is a front plan view showing the seat belt anchor mechanism and a fragmentary portion of the seat structure.

Referring to FIG. 1, the improved seat belt anchor mechanism is indicated generally at 10 and includes a guide member 12 which cooperates with slide member 14 mounted therein for horizontal movement. The slide member 14 is mounted to the side of the movable seat frame 16 by means of fasteners 18. Mounted on the top of the seat frame 16 is a seat pan 20 which is preferably covered with cushioning material 21. A back support frame member 22 is pivotally fastened on the seat frame member 16 and is adapted to support a back cushion member 23. The seat pan member 20 can move upwardly and downwardly to absorb vibrations of the vehicle since it is mounted to a suspension system, such as the system shown in U.S. Pat. No. 3,109,961, and including springs (not shown), a shock absorber (not shown) and first and second scissors link members 24, 26 which are pivoted to each other and supported at their lower ends on a lower frame or main 27 carried by seat track member 80 which is movable fore and aft relative to the floor 46 of the vehicle.

Affixed to the guide member 12, such as by welding, is a support member 32 in the form of a plate having an upper support hole 34 and a lower support hole 36. A support pin 38 mounted in the lower support hole 36 and retained by a retainer ring 40 mounts the support member 32 to an elongated pivot link member 44 which is pivoted relative to the floor 46 of the vehicle on a bracket 48 having a bent or angled portion 50 for supporting the lower end of the pivot link 44. The pivot link 44 is mounted to the bracket member 48 by means of a pair of fasteners such as cotter pins 52 passing through spaced holes in the pivot link 44, a pair of metal washer members 54 and a pair of flexible elastomeric washer members 56 which deform to permit the desired relative pivoting movement between the pivot link 44 and the bracket 48. The floor bracket 48 is attached to the floor by means of a floor bolt 58.

A pair of sister hooks 64 on the end of a lap belt 66 mount the lap belt to an eye bolt 68 fastened through hole 44 in support member 32. The eye bolt 68 is also connected to the upper end of the tether belt 70 which has a pair of sister hooks 72 on its upper end and a similar pair of hooks 74 on its lower end which engage an eye bolt 76 mounted on the floor 46 of the vehicle. The lap belt and the tether belt are preferably made of a web material such as nylon and are conventional.

To provide a capability of fore and aft horizontal adjustment movement, the upper movable seat frame 16 is connected through links 24, 26 and lower frame 27 to a seat track member 80 attached which rides on and is guided by a floor track member 82 mounted on the floor 46 of the vehicle. The horizontal adjustment lever 84 is operated in the usual manner to release pawl means (not shown) on the seat track member 80 from track member 82 in order to adjust the seat to any desired horizontal position.

Figure 3:
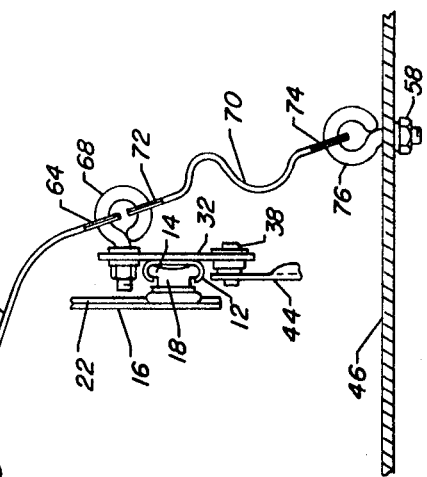
FIG. 3 is a front plan view similar to FIG. 2 but showing only a fragmentary portion of the seat belt anchor mecahnism with a lap belt and a floor tether belt attached to it.
Figure 4:
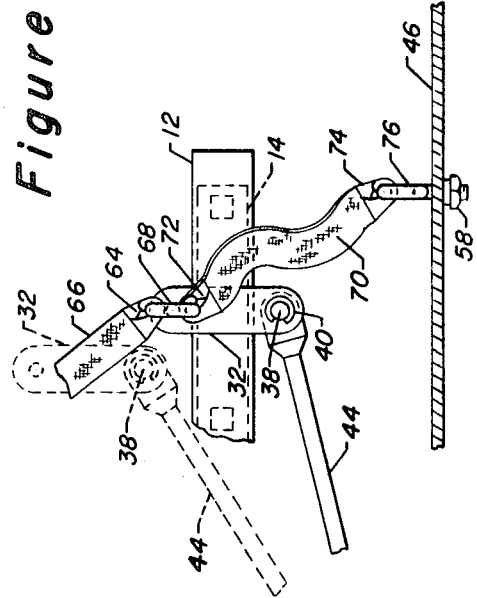
FIG. 4 is a side plan view similar to FIG. 1 but showing a fragmentary portion of the seat belt anchor mechanism in combination with a lap belt and a floor mounted tether belt.

Referring to FIGS. 3 and 4, it will be evident that fore and aft adjusting movement of seat frame 16 will have no effect on the position of anchor member 32. Thus, the tether belt 70 can be adjusted, or be of a fixed length, so that it will be taut whenever the seat frame 16 is in its uppermost position as shown in dotted lines in FIG. 4, regardless of the fore and aft position of the seat. Since the seat occupant does not tighten his lap belt 66 until after he has adjusted the seat to a particular fore and aft position, it will be appreciated that the tension on the belt 66 will remain substantially constant as the seat bounces up and down. The only variation in tension is that caused by the horizontal component of movement of the support pin 38 due to its pivoted movement on link 44. This horizontal component is evident in FIG. 4 by comparing the solid line position to the dotted line position.

We claim as our invention:

1. A seat belt anchor mechanism for a suspension seat having an upper seat support frame movable vertically and horizontally relative to a lower seat frame and to the frame of a vehicle to which the lower seat frame is adapted to be fastened, characterized in that said anchor mechanism comprises slide means including a guide member and a slide member slidable on said guide member, one of said members being fixed to said upper seat support frame and the other of said members being connected by pivot link means to the lower seat frame, and seat belt anchor support means integral with said other of said members and movable therewith, said anchor support means being movable vertically in response to up and down movements of said upper seat support frame but remaining stationary relative to the lower seat support frame in response to horizontal fore and aft adjustment movements of said seat support frame.

2. A seat belt anchor mechanism in accordance with claim 1 wherein said guide member is elongated and is longer than said slide member.

3. A seat belt anchor mechanism in accordance with claim 2 wherein said slide member is mounted on said upper seat support frame.

4. A seat belt anchor mechanism in accordance with claim 1 wherein said anchor support means is fixed to one end of a tether means which is connected at its other end to the floor of the vehicle, said tether means being of a length which will cause it to be tensioned when said upper seat support frame is in its uppermost position and untensioned when said upper seat support frame is in any lower position.

5. A seat belt anchor mechanism in accordance with claim 4 wherein said tether means comprises a flexible belt member.

6. A seat belt anchor mechanism in accordance with claim 4 wherein said tether means is affixed to the floor of a vehicle at a point rearward of the point at which it is attached to the anchor support means.

7. A seat belt anchor mechanism in accordance with claim 6 wherein said pivot link means comprises a pivoted link member which is attached to the lower seat support frame at a point forward of said seat belt anchor support means.

8. A seat belt anchor mechanism in accordance with claim 7 wherein said pivoted link member is mounted to said lower seat support frame by a resilient mounting.

* * * * *